(12) United States Patent
Babrowicz

(10) Patent No.: US 12,103,752 B2
(45) Date of Patent: Oct. 1, 2024

(54) VACUUM SKIN PACKAGE HAVING IMPLOSION-RESISTANT TOP WEB

(71) Applicant: Cryovac, LLC, Charlotte, NC (US)

(72) Inventor: Robert Babrowicz, Spartanburg, SC (US)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 18/109,633

(22) Filed: Feb. 14, 2023

(65) Prior Publication Data

US 2023/0278771 A1    Sep. 7, 2023

Related U.S. Application Data

(63) Continuation of application No. 16/092,260, filed as application No. PCT/US2017/027116 on Apr. 12, 2017, now Pat. No. 11,577,897.

(Continued)

(51) Int. Cl.
*B65D 75/30*    (2006.01)
*B29C 48/00*    (2019.01)
(Continued)

(52) U.S. Cl.
CPC ........ *B65D 75/305* (2013.01); *B29C 48/0017* (2019.02); *B29C 48/10* (2019.02); *B29C 48/21* (2019.02); *B29C 48/913* (2019.02); *B29C 51/10* (2013.01); *B32B 7/12* (2013.01); *B32B 27/08* (2013.01); *B32B 27/302* (2013.01); *B32B 27/304* (2013.01); *B32B 27/306* (2013.01);
(Continued)

(58) Field of Classification Search
None
See application file for complete search history.

(56) References Cited

U.S. PATENT DOCUMENTS

| RE30,009 E | 5/1979 | Perdue et al. |
| 4,927,691 A | 5/1990 | Bekele |

(Continued)

FOREIGN PATENT DOCUMENTS

| EP | 1398149 | 3/2004 |
| EP | 2796524 | 10/2014 |

(Continued)

OTHER PUBLICATIONS

Jester, Randy, Cyclic Olefin Copolymer Enhances Polyolefin Blends for Film Packaging, Plastic Technology, published Apr. 25, 2011 (Year: 2011).*

(Continued)

*Primary Examiner* — Michael C Miggins
(74) *Attorney, Agent, or Firm* — Jason R. Womer

(57) ABSTRACT

A packaged product has a product surrounded by a vacuum skin package. The vacuum skin package has a support member and an implosion-resistant thermoplastic top web. The top web conforms with both the upper surface of the product, and an uncovered portion of the upper surface of the support member. The thermoplastic top web comprises an ethylene/α-olefin copolymer in an amount of from 55 wt % to 85 wt %, based on total weight of top web, and/or a blend of ethylene/α-olefin copolymer and cyclic olefin copolymer. Also disclosed is a vacuum skin package containing the implosion-resistant top web.

16 Claims, 4 Drawing Sheets

Related U.S. Application Data

(60) Provisional application No. 62/321,886, filed on Apr. 13, 2016.

(51) Int. Cl.

| | |
|---|---|
| *B29C 48/10* | (2019.01) |
| *B29C 48/21* | (2019.01) |
| *B29C 48/88* | (2019.01) |
| *B29C 51/10* | (2006.01) |
| *B32B 7/12* | (2006.01) |
| *B32B 27/08* | (2006.01) |
| *B32B 27/30* | (2006.01) |
| *B32B 27/32* | (2006.01) |
| *B32B 27/34* | (2006.01) |
| *B32B 27/36* | (2006.01) |

(52) U.S. Cl.
CPC ............ *B32B 27/308* (2013.01); *B32B 27/32* (2013.01); *B32B 27/325* (2013.01); *B32B 27/327* (2013.01); *B32B 27/34* (2013.01); *B32B 27/36* (2013.01); *B32B 27/365* (2013.01); *B32B 2250/05* (2013.01); *B32B 2250/24* (2013.01); *B32B 2250/246* (2013.01); *B32B 2270/00* (2013.01); *B32B 2307/306* (2013.01); *B32B 2307/31* (2013.01); *B32B 2307/558* (2013.01); *B32B 2307/72* (2013.01); *B32B 2307/7244* (2013.01); *B32B 2307/738* (2013.01); *B32B 2439/40* (2013.01); *B32B 2439/70* (2013.01)

(56) References Cited

U.S. PATENT DOCUMENTS

| | | |
|---|---|---|
| 4,963,427 A | 10/1990 | Botto et al. |
| 5,048,268 A | 9/1991 | Brembilla et al. |
| 5,075,143 A | 12/1991 | Bekele |
| 5,491,009 A | 2/1996 | Bekele |
| 6,476,137 B1 | 11/2002 | Longo |
| 2005/0255196 A1 | 11/2005 | Opuszko et al. |
| 2006/0286323 A1 | 12/2006 | Siegel et al. |
| 2009/0208685 A1* | 8/2009 | Rivers ................ B32B 15/08 428/512 |
| 2011/0068042 A1 | 3/2011 | Palumbo |
| 2012/0045558 A1* | 2/2012 | Fanfani ............... B32B 27/34 426/396 |
| 2012/0204516 A1 | 8/2012 | Palumbo et al. |
| 2016/0068288 A1 | 3/2016 | Palumbo |
| 2016/0340098 A1 | 11/2016 | Palumbo |
| 2017/0355500 A1* | 12/2017 | Nambu ................ B32B 37/14 |
| 2019/0009499 A1 | 1/2019 | Fanfani |
| 2019/0030857 A1 | 1/2019 | Fanfani et al. |

FOREIGN PATENT DOCUMENTS

| | | | |
|---|---|---|---|
| WO | 9823500 | 6/1998 | |
| WO | 9834785 | 8/1998 | |
| WO | 2011138320 | 11/2011 | |
| WO | WO-2011138320 A1 * | 11/2011 | ............ B32B 27/34 |
| WO | 2014060507 | 4/2014 | |
| WO | 2015187174 | 12/2015 | |
| WO | 2017174605 | 10/2017 | |

OTHER PUBLICATIONS

Design News, TOPAS Advanced Polymers' New COC Film Grade, Design News, Feb. 8, 2010 (Year: 2010).*
The product information sheet for Affinity PL 1880G from Dow Plastics published Jan. 2005 (Year: 2005).*
Affinity PL1880G Dow (Year: 2005).*
Jester, COC PO Blends (Year: 2011).*
Design News, TOPAS (Year: 2010).*
Rosato et al., Plastics Design Handbook, Springer, New York, 2001 (Year: 2001).
Peacock, Andrew, Handbook of Polyethylene, Marcel Dekker Inc., New York, 2000, p. 16 (Year: 2000).

* cited by examiner

1

VACUUM SKIN PACKAGE HAVING IMPLOSION-RESISTANT TOP WEB

CROSS-REFERENCE TO RELATED APPLICATIONS

This application in a continuation of and claims priority to U.S. application Ser. No. 16/092,260, now U.S. Pat. No. 11,577,897 filed Oct. 9, 2018 entitled "Vacuum Skin Package Having Implosion-Resistant Top Web," and further claims priority to PCT Application Number US2017/027116 filed Apr. 12, 2017 and U.S. Provisional Patent Application Ser. No. 62/321,886, filed Apr. 13, 2016 the entirety of each of which is incorporated herein by reference.

BACKGROUND

Vacuum skin packaging (VSP) is carried out by placing a product on a support member, placing the support member with product thereon into a vacuum chamber in which the atmosphere is evacuated and a top web is drawn upward against a heated dome and thereafter draped down over the article and support member. The top web is made from a thermoplastic material.

After the top web is draped over the released, with the resulting atmospheric pressure forcing the top web to conform to the shape of the product and to that portion of the upper surface of the support member which extends around the product and is not covered by the product. As a result, the top web conforms precisely to the product and the surrounding portion of the upper surface of the support member, and together with the support member, forms a vacuum skin package which surrounds the product. When the vacuum is released from the chamber and atmospheric pressure comes to bear on the top web, the top web is thermoformed to take (i) the shape of the exposed extending portion of the support member, as well as (ii) the shape of the exposed surface of the product.

SUMMARY

Depending upon the nature of the product and the shape of the support member, the atmosphere can cause portions of the heated top web to be stretched to a high degree. It has been found that for some products, and with some support members, the top web can be drawn so much that it "implodes," i.e., fractures in a manner that forms one or more holes in the top web.

Various food products which can cause the top web to implode include, for example, a plurality of bone-in pork chops in a shingled arrangement on the top of the support member. Another embodiment that can cause top web implosion is two products placed flat down on the support member without touching one another but with a small gap therebetween. Yet another embodiment is a plurality of pork chops in overlapping relationship with an unfilled volume beneath (commonly referred to as an "undercut") at least a portion of one of the chops, with the top web being so drawn into the unfilled volume by the returning atmosphere that the top web fractures during the final stage of forming the vacuum skin package. In has been found that bone-in meat products produce a greater implosion challenge than boneless meat products.

Another factor which can enhance the risk of top web implosion is a support member in the form of a tray having side walls extending upward from a product support surface. During the formation of the vacuum skin package, the top web is drawn more in order to cover the exposed surfaces of the side walls as well as any exposed surface of the product support surface.

A first aspect is directed to a packaged product comprising a product and a vacuum skin package surrounding the product. The vacuum skin package comprises a support member having an upper surface, and an implosion-resistant thermoplastic top web. In the package, the top web conforms to both (i) an upper surface of the product, and (ii) a portion of the upper surface of the support member, the portion being uncovered by the product. The thermoplastic top web comprises a member selected from the group consisting of: (iii) at least one ethylene/α-olefin copolymer in a total amount of from 55 wt % to 85 wt %, based on total weight of the top web, and (iv) a blend of ethylene/α-olefin copolymer and cyclic olefin copolymer, the ethylene/α-olefin being present in the top web in a total amount of from 30 wt % to 80 wt %, and the cyclic olefin copolymer being present in the top web in a total amount of from about 1 wt % to 50 wt %, based on total weight of the top web.

In an embodiment, the thermoplastic top web comprises a member selected from the group consisting of (iii) at least one ethylene/α-olefin copolymer in a total amount of from 60 wt % to 80 wt %, based on total weight of the top web, and (iv) a blend of ethylene/α-olefin copolymer and cyclic olefin copolymer, with the ethylene/α-olefin being present in the top web in a total amount of from 40 wt % to 80 wt %, and with the cyclic olefin copolymer being present in the top web in a total amount of from 1.5 wt % to 35 wt %, based on total weight of the top web.

In an embodiment, the thermoplastic top web comprises a member selected from the group consisting of (iii) at least one ethylene/α-olefin copolymer in a total amount of from 65 wt % to 80 wt %, based on total weight of the top web, and (iv) a blend of ethylene/α-olefin copolymer and cyclic olefin copolymer, with the ethylene/α-olefin being present in the top web in a total amount of from 50 wt % to 75 wt %, and with the cyclic olefin copolymer being present in the top web in a total amount of from 2 wt % to 20 wt %, based on total weight of the top web.

In an embodiment, the thermoplastic top web comprises a member selected from the group consisting of (iii) at least one ethylene/α-olefin copolymer in a total amount of from 70 wt % to 80 wt %, based on total weight of the top web, and (iv) a blend of ethylene/α-olefin copolymer and cyclic olefin copolymer, with the ethylene/α-olefin being present in the top web in a total amount of from 65 wt % to 79 wt %, and with the cyclic olefin copolymer being present in the top web in a total amount of from 2 wt % to 6 wt %, based on total weight of the top web.

A second aspect is directed to a vacuum skin package having an implosion-resistant top web comprising a member selected from the group consisting of (A) at least one ethylene/α-olefin copolymer in a total amount of from 55 wt % to 85 wt %, based on total weight of the top web, and (B) a blend of ethylene/α-olefin copolymer and cyclic olefin copolymer, the ethylene/α-olefin being present in the top web in a total amount of from 30 wt % to 80 wt %, and the cyclic olefin copolymer being present in the top web in a total amount of from about 1 wt % to 50 wt %, based on total weight of the top web. The vacuum skin package of the second aspect can have any of the packaging article features in accordance with the first aspect.

A third aspect is directed to a vacuum skin package having an implosion-resistant top web. The implosion resistant top web includes a multilayer film comprising a heat-seal and product-contact layer, a heat-resistant outside layer, an oxygen barrier layer, a first tie layer, a second tie layer, a first bulk layer, and a second bulk layer. The heat seal and product contact layer comprises at least one ethylene/α-olefin copolymer in a total amount of from 40 wt % to 95 wt %, based on weight of the heat seal and product contact layer, and a cyclic olefin copolymer in an amount of from 1 wt % to 50 wt %, based on weight of the heat seal and product contact layer. The heat resistant outside layer comprising at least one member selected from the group consisting of low density polyethylene, high density polyethylene, polypropylene, polyester and cyclic olefin copolymer. The oxygen barrier layer comprises at least one member selected from the group consisting of saponified ethylene/vinyl acetate copolymer, polyvinylidene chloride, and polyamide. The oxygen barrier layer is between the heat-seal product-contact layer and the heat resistant outside layer. The first tie layer comprises at least one member selected from the group consisting of ethylene/carboxylic acid copolymer, ethylene/ester copolymer, anhydride-modified ethylene/alpha-olefin copolymer, anhydride-modified high density polyethylene, and anhydride modified low density polyethylene. The first tie layer is between the oxygen barrier layer and the heat seal and product-contact layer. The second tie layer comprises at least one member selected from the group consisting of ethylene/carboxylic acid copolymer, ethylene/ester copolymer, anhydride-modified ethylene/alpha-olefin copolymer, anhydride-modified high density polyethylene, and anhydride modified low density polyethylene. The second tie layer is between the oxygen barrier layer and the heat resistant outside layer. The first bulk layer comprises at least one member selected from the group consisting of ethylene/alpha-olefin copolymer, cyclic olefin copolymer, olefin homopolymer, ethylene/unsaturated ester copolymer, ionomer resin, propylene/ethylene copolymer, polystyrene, polyamide, polyester, and polycarbonate. The first bulk layer is between the first tie layer and the heat seal and product-contact layer. The second bulk layer comprises at least one member selected from the group consisting of ethylene/alpha-olefin copolymer, cyclic olefin copolymer, olefin homopolymer, ethylene/unsaturated ester copolymer, ionomer resin, propylene/ethylene copolymer, polystyrene, polyamide, polyester, and polycarbonate. The second bulk layer is between the second tie layer and the outer abuse layer.

In an embodiment, the heat seal and product contact layer comprises the ethylene/α-olefin copolymer in a total amount of from 45 wt % to 90 wt %, based on weight of the heat seal and product contact layer, and the cyclic olefin copolymer is present in an amount of from 5 wt % to 47 wt %, based on weight of the heat seal and product contact layer. In another embodiment, the heat seal and product contact layer comprises the ethylene/α-olefin copolymer in a total amount of from 50 wt % to 85 wt %, based on weight of the heat seal and product contact layer, and the cyclic olefin copolymer is present in an amount of from 15 wt % to 44 wt %, based on weight of the heat seal and product contact layer. In another embodiment, the heat seal and product contact layer comprises the ethylene/α-olefin copolymer in a total amount of from 55 wt % to 80 wt %, based on weight of the heat seal and product contact layer, and the cyclic olefin copolymer is present in an amount of from 25 wt % to 40 wt %, based on weight of the heat seal and product contact layer.

DETAILED DESCRIPTION

Figure 1:
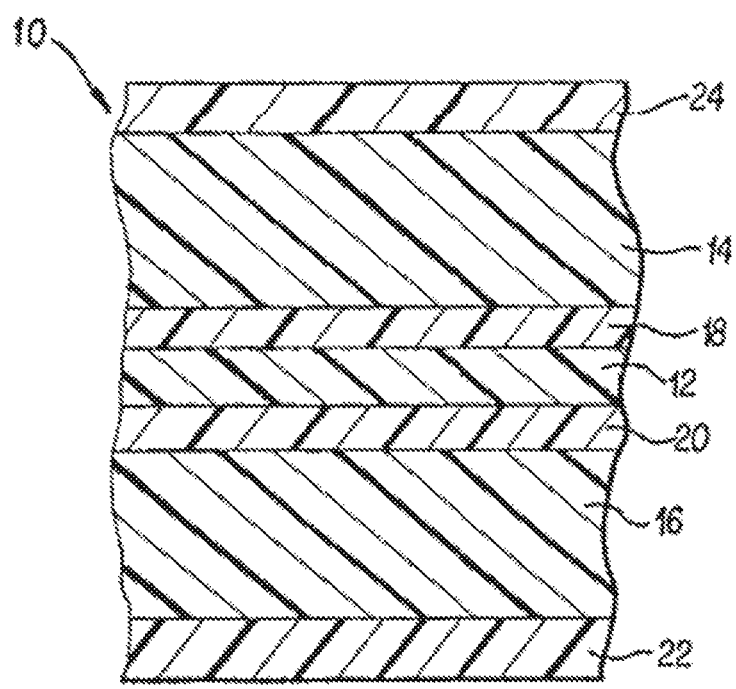
FIG. 1 is a schematic of a cross-sectional view of a multilayer film suitable for use as a top web.

As used herein, the term "film" is used in a generic sense to include plastic web, regardless of whether it is film or sheet.

As used herein, the term "packaged product" refers to a product packaged in a packaging article.

As used herein, the term "packaging article" refers to an article made from packaging materials, the article surrounding a product or being designed to surround a product.

As used herein, the phrases "seal layer", "sealing layer", "heat seal layer", and "sealant layer", refer to an outer film layer, or layers, involved in the sealing of the film to itself, another film layer of the same or another film, and/or another article which is not a film. The phrase "sealant layer" generally refers to the inside film layer of a package, the inside layer frequently also serving as a food contact layer in the packaging of foods.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as using a hot wire, hot knife, heated bar, hot air, infrared radiation, ultrasonic sealing, etc. More preferably, the seal is formed by hot wire and/or hot knife. As is known to those of skill in the art, a static lap seal is another seal useful in forming a package from the film of the present invention.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and preferably the second monomer copolymerizes in a higher weight percent than the third monomer, etc.

As used herein, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s).

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER®) linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally has ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from heterogeneous polymers such as VLDPE's which are available commercially which generally have a broad composition distribution as assessed by CDBI values generally less than 55%. The CDBI of a copolymer is readily calculated from data obtained from techniques known in the art, such as, for example, TREF as described, for example, in Wild et. al., *J. Poly. Sci. Poly. Phys. Ed., Vol.* 20, p. 441 (1982). Preferably, the homogeneous ethylene/alpha-olefin copolymers have a CDBI greater than about 70%, i.e., a CDBI of from about 70% to 99%. Such homogeneous polymers exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$-$C_{20}$ alpha-monoolefin, more preferably, a $C_4$-$C_{12}$ alpha-monoolefin, still more preferably, a $C_4$-$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. Nos. 5,206,075, 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and a non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type. More preferably, however, the polyolefin is a the polymerization product of one or more unsubstituted olefins, the polyamide is the polymerization product of one or more unsubstituted amides, etc.

As used herein, the phrase "ethylene alpha-olefin copolymer", and "ethylene/alpha-olefin copolymer", refer to such heterogeneous materials as linear low density polyethylene (LLDPE), and very low and ultra-low density polyethylene (VLDPE and ULDPE); and homogeneous polymers such as metallocene-catalyzed EXACT® linear homogeneous ethylene/alpha olefin copolymer resins obtainable from the Exxon Chemical Company, of Baytown, Texas, and TAFMER® linear homogeneous ethylene/alpha-olefin copolymer resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from The Dow Chemical Company, known as AFFINITY® resins, are also included as another type of homogeneous ethylene/alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

As used herein, the phrase "cyclic olefin copolymer" is inclusive of all cyclic olefin polymers. Ethylene norbornene copolymer is a preferred cyclic olefin copolymer. In an embodiment, the ethylene/norbornene copolymer has a density of less than 0.98 $g/cm^3$. In an embodiment, the ethylene/norbornene copolymer has a melt index of less than 1.5 dg/min.

As used herein, the phrases "inner layer" and "internal layer" and "intermediate layer" refer to any layer, of a multilayer film, having both of its principal surfaces directly adhered to another layer of the multilayer film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces is adhered to another layer of the film.

As used herein, the phrase "inside layer" refers to the outer layer, of a multilayer film packaging a product, which is closest to the product, relative to the other layers of the multilayer film. "Inside layer" also is used with reference to the innermost layer (which is also an outer layer) of a plurality of concentrically arranged layers extruded through one or more annular dies. The inside layer is also frequently referred to as the "seal layer" or as the "heat seal layer."

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers extruded through one or more annular dies.

The packaging article can be used for the packaging of a wide variety of products, including both food products and non-food products. However, the film is especially useful as the top web in a vacuum skin package for the packaging of meat products, particularly bone-in meat products (pork chops, steaks, etc) and boneless meat products. Typical meat products include beef, pork, foul, fish, lamb, etc., and include fresh meat products and processed meat products, such as sausage. Higher implosion resistance is needed when vacuum skin packaging a plurality of bone-in pork chops, steaks, etc, in shingled configuration on the support member or in randomly placed configuration on the support member.

The top web film used in the packaged product can have a maximum thickness of from 3 to 9 mils, or from 3.2 to 8 mils, or from 3.4 mils to 7.5 mils, or from 3.6 mils to 7 mils, or from 3.8 mils to 6.5 mils, or from 4 mils to 6 mils. As used herein, the phrase "maximum thickness" is used because the top web is produced at a desired thickness but some portions of the top web are drawn down (i.e., reduced in thickness) by the thermoforming which occurs during the process of making a vacuum skin package. The portions of the top web which are not drawn down during the packaging process retain the maximum thickness of the top web, i.e., the original thickness of the top web before it is used in the vacuum skin packaging process.

In an embodiment, the top web film may have following layer arrangement:

(inside) Seal/$1^{st}$ Bulk/$1^{st}$ Tie/$O_2$-Barrier/$2^{nd}$ Tie/$2^{nd}$ Bulk/Abuse (outside)

In another embodiment, the top web film is made from a multilayer film of the following layer arrangement:

(inside) Seal/1$^{st}$ Bulk/2$^{nd}$ Bulk/1$^{st}$ Tie/O$_2$-Barrier/2$^{nd}$ Tie/2$^{nd}$ Bulk/Abuse (outside)

In an embodiment, the top web does not comprise ethylene/vinyl acetate copolymer.

In an alternative embodiment, the top web comprises ethylene/vinyl acetate copolymer in an amount of from 1 wt % to 10 wt %, based on total top web weight.

In an embodiment, the top web does not comprise ionomer resin.

In an alternative embodiment, top web comprises ionomer resin in an amount of from 1 wt % to 10 wt %, based on total top web weight.

FIG. 1 illustrates a seven layer film 10 is designed primarily for vacuum packaging and especially for vacuum skin packaging. Film 10 is designed for use as the outer top web film for use in a vacuum skin package. The core layer 12 is an oxygen barrier layer. Intermediate layer 18 is a first tie layer. Intermediate layer 20 is a second tie layer. Outer layer 24 is a heat seal and product-contact layer. Outer layer 22 is an outer abuse layer. Intermediate layer 14 is a first bulk layer, and is between the first tie layer 18 and outer layer 24. Intermediate layer 16 is a second bulk layer, and is between second tie layer 20 and outer abuse layer 22.

In an embodiment of the multilayer top web film, the outer heat seal and product-contact layer can comprise at least one member selected from the group consisting of ethylene/α-olefin copolymer, cyclic olefin copolymer, low density polyethylene, high density polyethylene, ethylene/vinyl acetate copolymer with a vinyl acetate content in the 3% to 9% range by weight, ionomer resin, ethylene methacrylic acid copolymer, and ethylene methyl acrylate copolymer. In another embodiment, the outer heat seal layer comprises ethylene/α-olefin copolymer and cyclic olefin copolymer. In another embodiment, the outer heat seal and product contact layer comprises ethylene/α-olefin copolymer and cyclic olefin copolymer and at least one member selected from the group consisting of low density polyethylene, high density polyethylene, ethylene/vinyl acetate copolymer with a vinyl acetate content in the 3% to 9% range by weight, ionomer resin, ethylene methacrylic acid copolymer, and ethylene methyl acrylate copolymer.

In an embodiment, the top web has a seal layer comprising from 10 wt % to 50 wt % cyclic olefin copolymer in a blend with from 40 wt % to 90 wt ethylene/α-olefin copolymer. In another embodiment, the top web has a seal layer comprising from 15 wt % to 45 wt % cyclic olefin copolymer in a blend with from 45 wt % to 85 wt % ethylene/α-olefin copolymer. In another embodiment, the top web has a seal layer comprising from 20 wt % to 40 wt % cyclic olefin copolymer in a blend with from 50 wt % to 80 wt % ethylene/α-olefin copolymer. In another embodiment, the top web has a seal layer comprising from 25 wt % to 40 wt % cyclic olefin copolymer in a blend with from 55 wt % to 70 wt % ethylene/α-olefin copolymer.

The outer heat seal and product-contact layer of the top web can contain one or more olefin homopolymer or ethylene/α-olefin copolymer which together have an average density of less than 0.92 g/cc, or less than 0.915 g/cc, or less than 0.912 g/cc, or less than 0.910 g/cc, or less than 0.909 g/cc, or less than 0.908 g/cc, or less than 0.907 g/cc, or less than 0.906 g/cc, or less than 0.905 g/cc, or less than 0.904 glee, or less than 0.903 g/cc, or from 0.900 to 0.915 g/cc, or from 0.900 to 0.912 g/cc, or from 0.900 to 0.910 glee, or from 0.901 to 0.909 g/cc, or from 0.902 to 0.908 g/cc, or from 0.903 to 0.907 g/cc.

The heat seal layer can have a thickness of at least 0.1 mil, or from 0.15 to 5 mils, or from 0.18 to 4 mils, or from 0.2 to 2 mils, or from 0.1 to 1.5 mil, or from 0.2 to 1.1 mil, or from 0.25 to 1 mil; or from 0.3 to 0.8 mil, or from 0.35 to 0.7 mil, or from 0.35 to 0.6 mil, or from 0.4 to 0.6 mil, or from 0.4 to 0.6 mil, or about 0.5 mil.

The top web can comprise a first bulk layer between the first tie layer and the heat seal and product-contact layer, and a second bulk layer between the second tie layer and the outer abuse layer.

In an embodiment, each of the bulk layers comprises at least one member selected from the group consisting of ethylene/alpha-olefin copolymer and cyclic olefin copolymer.

In another embodiment, each of the bulk layers comprises at least one member selected from the group consisting of ethylene/alpha-olefin copolymer, cyclic olefin copolymer, ethylene homopolymer, ethylene/unsaturated ester copolymer, ionomer resin, propylene/ethylene copolymer, polystyrene, polyamide, polyester, and polycarbonate. Bulk layers are usually relatively thick, and/or are made from relatively strong polymers, as the purpose of bulk layers is to add strength, puncture resistance, etc. to the film.

If a blend of more than one ethylene/α-olefin copolymer is present, the blend is herein characterized as having an "average density" which is the weighted average of the densities of the various ethylene/α-olefin copolymers present, i.e., the densities of the various ethylene/α-olefin copolymers present taken in combination with their relative weight percent's in the blend. Similarly, the density of different ethylene/α-olefin copolymers in the heat seal and product-contact layer, together with the ethylene/α-olefin copolymers in the intermediate bulk layers, or any subset or set of layers, including up to all of the layers of the film, can be expressed as an "average density," i.e., characterized with a weighted average of the densities of the group of polymers even if they are present in different layers, i.e., not all blended together.

The ethylene/α-olefin copolymers are primarily present in the heat-seal and product-contact layer and in the bulk layers. In an embodiment, the ethylene/α-olefin copolymer(s) in the top web have an average density of from 0.88 g/cm$^3$ to 0.915 g/cm$^3$. In another embodiment, the ethylene/α-olefin copolymer(s) in the top web have an average density of from 0.885 g/cm$^3$ to 0.91 g/cm$^3$. In another embodiment, the ethylene/α-olefin copolymer(s) in the top web have an average density of from 0.885 g/cm$^3$ to 0.91 g/cm$^3$. In another embodiment, the ethylene/α-olefin copolymer in the top web has a density of from 0.90 g/cm$^3$ to 0.91 g/cm$^3$. In another embodiment, the ethylene/α-olefin copolymer(s) in the top web have an average density of from 0.902 g/cm$^3$ to 0.908 g/cm$^3$. In another embodiment, the ethylene/α-olefin copolymer(s) in the top web have an average density of from 0.90 g/cm$^3$ to 0.91 g/cm$^3$.

In another embodiment, the ethylene/α-olefin copolymer comprises at least one heterogeneous ethylene/α-olefin copolymer(s) having an average density of from 0.90 g/cm$^3$ to 0.91 g/cm$^3$. In another embodiment, the ethylene/α-olefin copolymer comprises at least one heterogeneous ethylene/α-olefin copolymer(s) having an average density of from 0.902 g/cm$^3$ to 0.908 g/cm$^3$. In another embodiment, the ethylene/α-olefin copolymer comprises at least one heterogeneous ethylene/α-olefin copolymer(s) having an average density of from 0.904 g/cm$^3$ to 0.906 g/cm$^3$.

In an embodiment, the top web film comprises ethylene/α-olefin copolymer having a melt index of from 0.5 to 4 dg/min, or 0.8 to 3 dg/min, or from 1 to 2 dg/min. In an embodiment, the top web film comprises ethylene/α-olefin copolymers having an average melt index of from 0.5 to 4 dg/min, or 0.8 to 3 dg/min, or from 1 to 2 dg/min. The average melt index is a weighted average of all the ethylene/alpha-olefin copolymer in the top web, determined in a manner corresponding with the manner in which average density is determined, as described herein. That is, the average density of more than one ethylene/alpha-olefin copolymer is a weighted average.

The multilayer top web film can comprise an oxygen barrier layer comprising a member selected from the group consisting of saponified ethylene/vinyl acetate copolymer, polyvinylidene chloride, and polyamide.

The multilayer top web film can comprise an outer abuse layer designed for the exterior of the final package. The abuse layer provides heat resistance during the vacuum skin packaging process.

The abuse layer may comprise at least one member selected from the group consisting of low density polyethylene, high density polyethylene, polypropylene, polyester (particularly polyethylene terephthalate), and cyclic olefin copolymer. For processability, melt indices of between about 5 and 8 are preferred for the abuse layer.

The top web can comprise a first tie layer between the oxygen barrier layer and the heat seal and product-contact layer, and a second tie layer between the oxygen barrier layer and the outer abuse layer. Preferred polymers for use in tie layers include ethylene/carboxylic acid copolymer, ethylene/ester copolymer, and anhydride-modified ethylene/alpha-olefin copolymer, anhydride-modified high density polyethylene, and anhydride modified low density polyethylene. Generally, tie layers are relatively thin, as their purpose is simply to provide a chemically compatible composition between two layers which otherwise do not bond with one another to a desired degree.

The film from which the top web is made may be partially or wholly irradiated to induce crosslinking. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film. The extrusion coating process illustrated in FIG. 2 (described below) allows various layers to be extruded and crosslinked before an irradiation-sensitive polyvinylidene chloride $O_2$-barrier layer and other layers are extruded on top of the irradiated, crosslinked substrate portion of the multilayer film tubing, resulting in a stronger tubing film, whereas a full coextrusion of all the layers together, followed by irradiation, could result in degradation of the PVDC layer, causing a decrease in its oxygen barrier properties.

To produce crosslinking, a suitable radiation dosage of high energy electrons, preferably using an electron accelerator, with a dosage level being determined by standard dosimetry methods. Other accelerators such as a Van de Graaf generator or resonating transformer may be used. The radiation is not limited to electrons from an accelerator since any ionizing radiation may be used. The ionizing radiation can be used to crosslink the polymers in the film.

Figure 2:
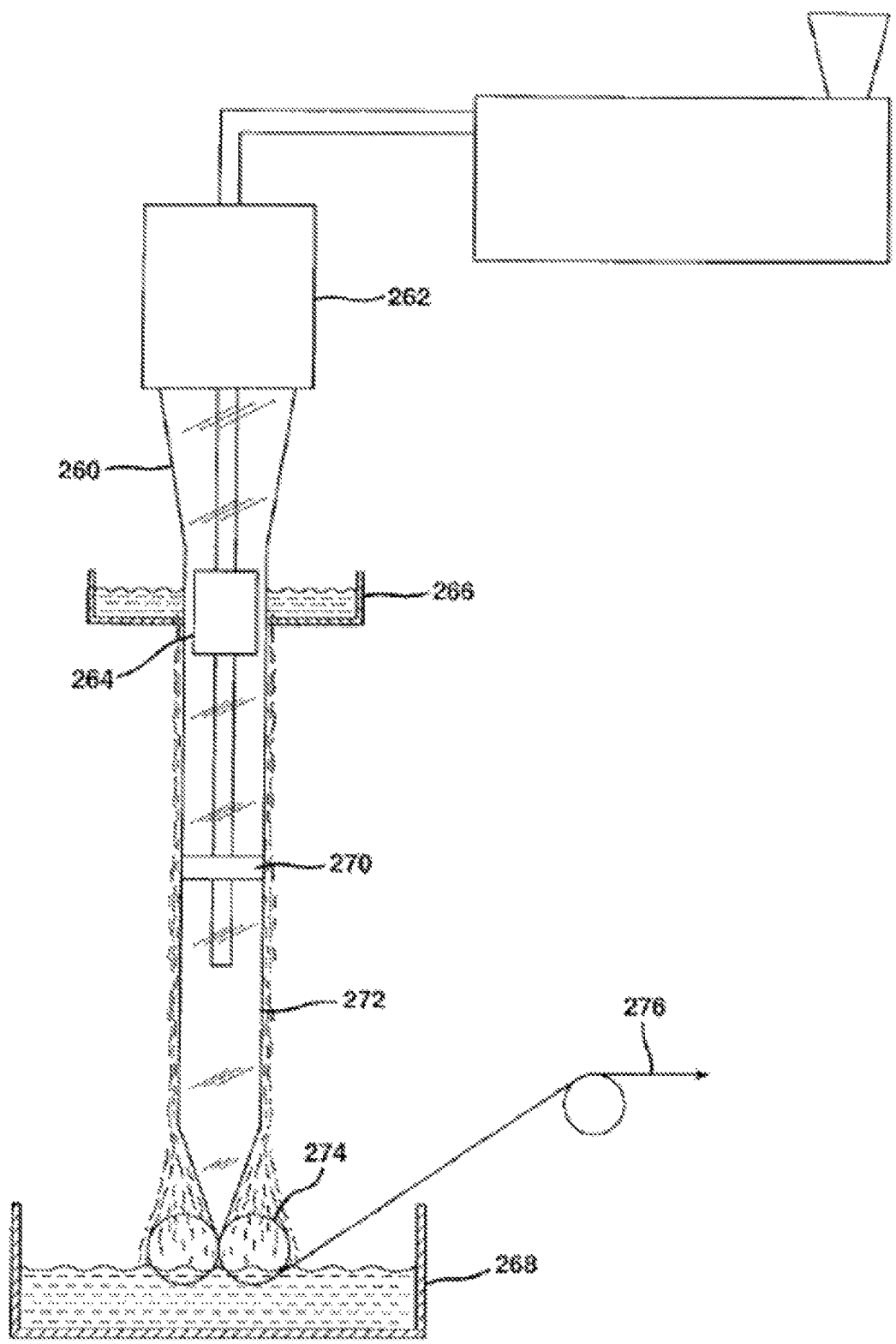
FIG. 2 is a schematic of a process for producing a multilayer film suitable for use as a top web in a vacuum skin package, i.e., such as the film of FIG. 1.

Although not illustrated in FIG. 2, preferably the film is irradiated at a level of from 180-220 kGy (kilograys). As can be seen from the descriptions of preferred films for use in the present invention, the most preferred amount of radiation is dependent upon the film composition, thickness, etc., and its end use.

In an embodiment, the support member is a multilayer structure comprising a support sheet having a liner film laminated thereto. In an embodiment, the support sheet is made from a member selected from the group consisting of polypropylene and polyethylene terephthalate.

In an embodiment, the liner film is a multilayer film having a bonding layer which is adhered to the support sheet, an outer heat seal & food-contact layer, and an oxygen barrier layer between the heat seal & food-contact layer and the bonding layer. The oxygen barrier layer may comprise a member selected from the group consisting of saponified ethylene/vinyl acetate copolymer, polyvinylidene chloride, and polyamide.

In the liner film, the heat seal & food-contact layer may comprise any of the above-described polymers to be used in the heat seal and product-contact layer of the multilayer top web film.

In the liner film, the bonding layer may comprise anhydride grafted polypropylene.

In the liner film, the tie layer, which is between the oxygen barrier layer and the heat seal & food-contact layer, may comprise at least one member selected from the group consisting of ethylene/carboxylic acid copolymer, ethylene/ester copolymer, anhydride-modified ethylene/alpha-olefin copolymer, anhydride-modified high density polyethylene, and anhydride modified low density polyethylene. This tie layer may be a first tie layer comprising an anhydride modified ethylene/α-olefin copolymer, with the liner film further comprising a second tie layer which is between the first tie layer and the heat seal & food-contact layer. The second tie layer may comprise ethylene/methyl acrylate copolymer.

The liner film may have a maximum thickness of from 1.2 mils to 2 mils, or 1.4 mils to 1.8 mils.

In an embodiment, the support member is flat and comprises a flat support sheet and a flat liner film.

In an embodiment, the support member is a tray having a bottom product support portion and side walls extending upwardly from the product support portion, with the tray comprising a laminate comprising a support member having a liner film bonded thereto. An unformed laminate can be thermoformed to form the tray.

Various films were produced in the form of multilayer film tubings, using the process illustrated in FIG. 2. The process of FIG. 2 is as generally disclosed in U.S. Pat. No. 4,287,151, to ESAKOV, et. al., hereby incorporated by reference thereto, in its entirety.

In the process illustrated in FIG. 2, tubular extrudate 260 was downwardly formed from die 262, the tubular extrudate enclosing air mandrel 264. At approximately this point in the process, an exterior cooling means, in the form of water ring 266, encircles tubular extrudate 260. Water ring 266 in the shape of a circular tray, had an opening therethrough, the opening having a diameter slightly larger than that of tubular extrudate 260. A constant flow of water, at about 50° F., is supplied to water ring 266. The overflow from the water ring provided an annular film of water on the outer surface of extrudate 260. The water fell downwardly around the entire outer periphery of extrudate 260, thereby cooling extrudate 260. The film of water is collected by receptacle 268. Water was the preferred cooling medium because its heat capacity and heat transfer characteristics are such as to cool extrudate 260 more rapidly than a chilled gas would have. However, as an alternative to water ring 266, a fine spray of cooled water could have been directed against the exterior surface of the extrudate 260. In combination, air mandrel 264 and water ring 266 serve as the means to cool and solidify extrudate 260. In some instances, depending upon the polymer being extruded and upon the wall thickness of extrudate 260, either the interior or exterior cooling could be eliminated, because one cooling means alone would be sufficient to solidify the interior tube wall before reaching support plug 270. Once solidified, extrudate 272 is collapsed by rolls 274, to form a solidified lay flat tubing 276. The wound up film can be irradiated before windup or unwound and irradiated before use.

Figure 4:
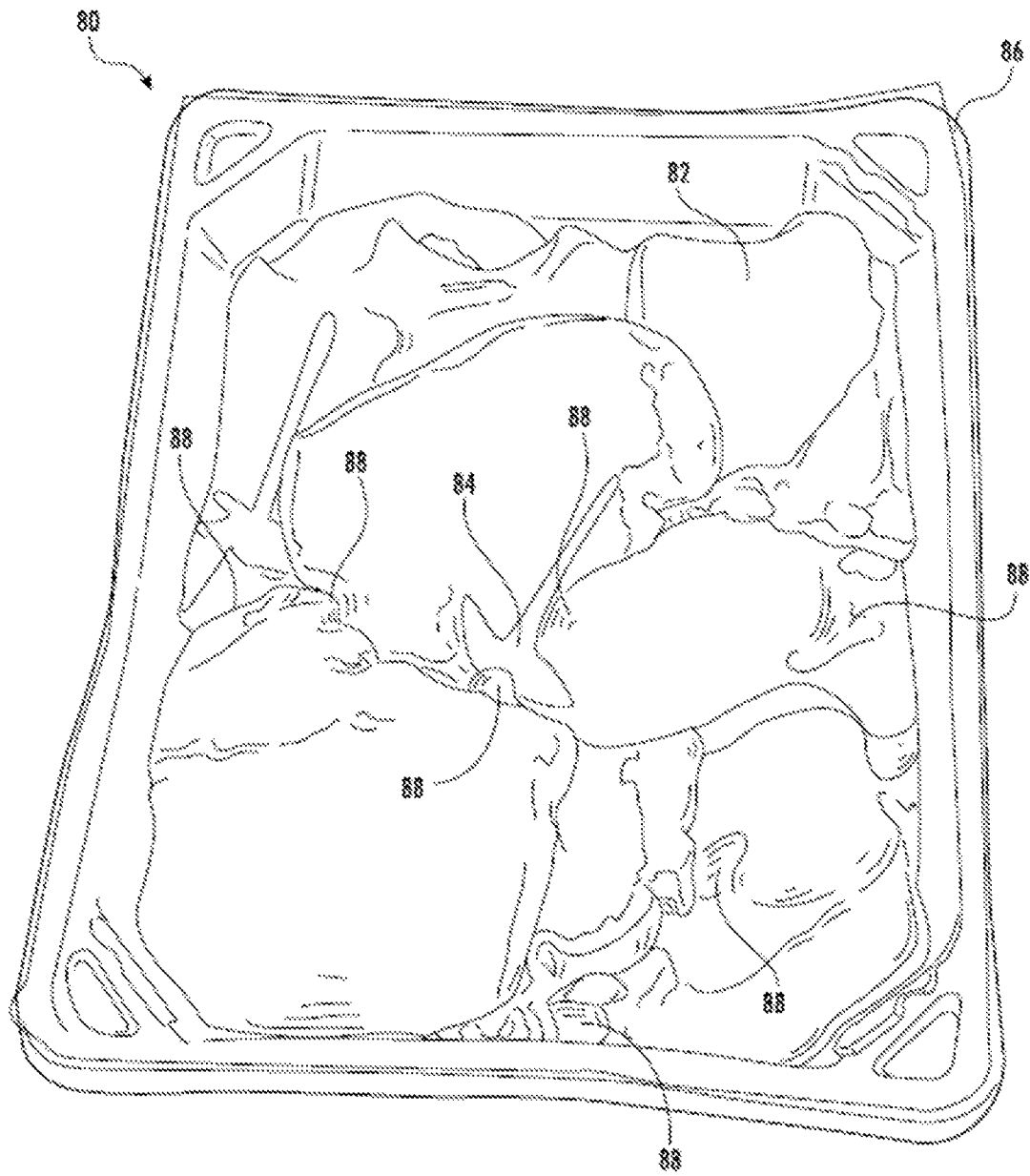
FIG. 4 is a perspective view of a vacuum skin package having a plurality of bone-in pork chops.

FIG. 4 illustrates packaged product 80 comprising a plurality of pork chops 82 having bones 84 are more or less randomly arranged on a thermoformed tray 86 which is a support member made from a polypropylene sheet to which a liner film has been bonded, with the resulting laminate being thermoformed into tray 86. The transparent top web has been heated and draped over tray 86 and product 82, so that product 82 is vacuum packaged and surrounded by the combination of the transparent top web and the liner film bonded to the support member. As both the liner film and the top web are multilayer films comprising an oxygen barrier layer, the shelf life of product 82 is extended by vacuum skin package article. The convoluted top surface produced by the random arrangement of the bone-in pork chops 82 produces a plurality of cavities 88 into which the top web is thermoformed during the vacuum skin packaging process. Unless the top web is capable of withstanding the stress of the heavy degree of thermoforming into cavities 88, the top web will break, causing the package to fail. However, the top web utilized in the package of FIG. 4 exhibited a high degree of Implosion Resistance, as it is in accord with the first aspect, described above.

Implosion Resistance Test

Figure 3:
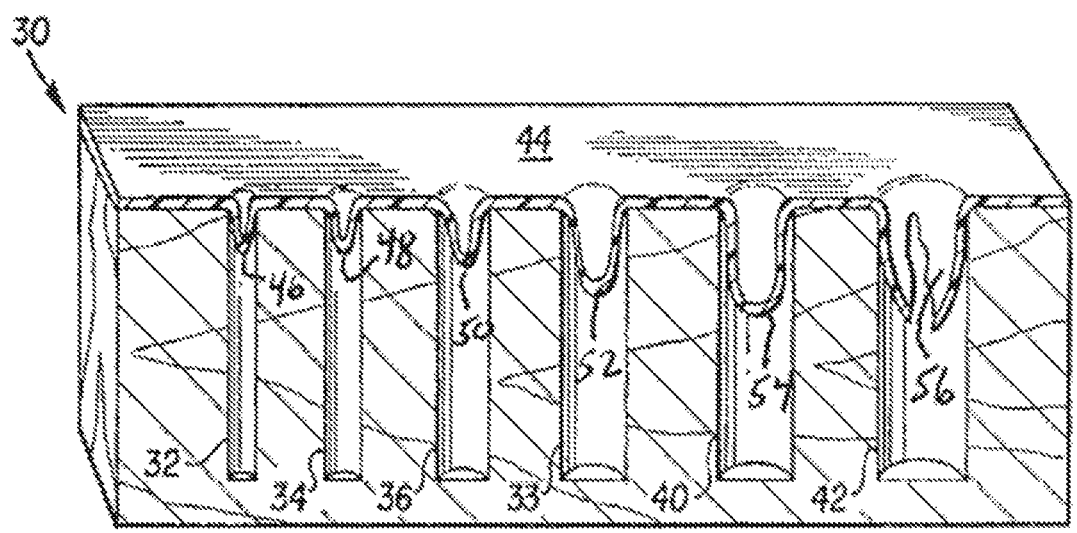
FIG. 3 is a schematic of a test block used in an Implosion Resistance Test, with film being tested thereon.

The Implosion Resistance Test is illustrated in FIG. 3. The Implosion Resistance Test measures the maximum diameter of the openings over which the top web can be heated and stretched, without breaking, during vacuum skin packaging.

A drilled wooden block 30 is drilled part way through with a series of bits of different diameters, ranging from the smallest diameter of 5/16 (8 mm) inch, to the largest diameter of 1 inch (25.4 mm). In block 30 as illustrated in FIG. 3, bores 32, 34, 36, 38, and 42 extend into the block from respective openings. Each bore has been drilled to the same depth of one inch. The openings are circular holes defined by the intersection of each cylindrical bore with the planar upper face of wooden block 30.

The block is vacuum skin packaged in a CRYOVAC® VS-44 machine. The top web film 44 is used to completely envelop the block 80. During the packaging tests with wooden block 30, the film tends to undergo a stretching stress which increases with the increasing hole diameter. In the example illustrated in FIG. 3, film portions 46, 48, 50, 52, and 54 stretch without breaking over the holes 32, 34, 36, 38, and 40, but film portion 56 breaks inside hole 42. The diameter in mm of the largest hole before the film becomes broken (i.e., hole 40 in the test illustrated in FIG. 2) is the implosion resistance rating of the top web film being tested. The implosion resistance rating is highly representative of the film packaging ability of the top web film in a vacuum skin packaging process. A set of 44 tests are performed on each film, with the results averaged, to provide an "average implosion resistance". The test is conducted in a room at 23 C and 1 atm pressure and 50% relative humidity.

The packaging tests on block 30 were conducted throughout the examples herein on a CRYOVAC VS44 machine equipped with a rotary vacuum pump and a serially connected auxiliary pump. The temperature under the heater bell was of 200° C., and the films were infrared pre-heated up to 70° C. to 80° C. The level of the vacuum provided varied between 3 and 6 millibars.

The top web film can have an average implosion resistance of at least 11.5 millimeters, or at least 13 millimeters, or at least 14 millimeters, or at least 14.5 millimeters, or at least 15 millimeters, or at least 15.4 millimeters, or at least 15.8 millimeters, or at least 16 millimeters.

EXAMPLES

Table 1, below, provides the identity of various resins used in making various working and comparative top web films for the vacuum skin package, as well as for a liner film to be adhered to a support sheet to make the support member on which a product to be packaged is place.

TABLE 1

| Resin code | Tradename | Generic Resin Name {additional information} | Density (g/cc) | Melt Index (dg/min) | Supplier |
|---|---|---|---|---|---|
| ssPE 1 | AFFINITY® EG 8100 G1 | homogeneous ethylene/octene copolymer | 0.870 | 0.99 | Dow |
| ssPE 2 | AFFINITY® PL 1281G1 | Homogeneous ethylene/octene copolymer | 0.900 | 6.0 | Dow |
| ssPE 3 | EXACT® 3128 | Homogeneous ethylene/butene copolymer | 0.900 | 1.3 | ExxonMobil |
| ssPE 4 | AFFINITY® PL 1850G | Homogeneous ethylene/octene copolymer | 0.902 | 3.0 | Dow |
| ssPE 5 | EXCEED® 1012HA | Homogeneous ethylene/hexene copolymer | 0.912 | 1.0 | ExxonMobil |
| ssPE 6 | EXCEED® 1012CA | Homogeneous ethylene/hexene copolymer | 0.912 | 1.0 | ExxonMobil |
| ssPE 7 | EXCEED® 1012HJ | Homogeneous ethylene/hexene copolymer | 0.912 | 1.0 | ExxonMobil |
| ssPE 8 | EXCEED® 4518PA | Homogeneous ethylene/hexene copolymer | 0.918 | 4.5 | ExxonMobil |
| EtCop | INFUSE® PE D9007.10 OBC | Olefin block copolymer | 0.866 | 0.5 | DOW |
| hPE 1 | ATTANE® 4203 | Ethylene/hexene copolymer | 0.9052 | 8.6 | Dow |
| hPE 2 | CV77525 | Very low density polyethylene | 0.906 | 0.45 | Westlake Chemical |

TABLE 1-continued

| Resin code | Tradename | Generic Resin Name {additional information} | Density (g/cc) | Melt Index (dg/min) | Supplier |
|---|---|---|---|---|---|
| hPE 3 | ATTANE 4201G | Heterogeneous ethylene/octene copolymer | 0.912 | 1.0 | Dow |
| hPE 4 | XUS 61520.15L | Very low density polyethylene | 0.903 | 0.5 | Dow |
| HDPE1 | SURPASS HPs667-AB | High density polyethylene | 0.968 | 6.0 | Nova Chemicals. |
| HDPE2 | T60-500-119 | High density polyethylene | 0.968 | 6.0 | Nova Chemicals. |
| LDPE | LD259 | Low density polyethylene | 0.915 | 12 | ExxonMobil |
| PEC | R01C-00 | Heterogeneous propylene/ethylene copolymer | 0.900 | 2.0 | Ineos |
| ENB 1 | 8007F-400 | Ethylene/norbornene copolymer | 1.02 | 2.04 | Topas Advanced Polymers Inc. |
| ENB 2 | TOPAS 9903D-10 | Ethylene/norbornene copolymer | 0.974 | 1.0 | Topas Advanced Polymers Inc. |
| EVA1 | ELVAX 3165 | Ethylene/vinyl acetate copolymer (20% VA) | 0.940 | 0.70 | DuPont |
| EVA2 | LEVAMELT 400 | Ethylene/vinyl acetate copolymer (>20% VA) | 0.98 | 3 | Lanxess |
| mEVA | BYNEL 3861 | Anhydride-modified ethylene/vinyl acetate copolymer | 0.980 | 2.0 | DuPont |
| mLLD 1 | BYNEL 4125 | Maleic anhydride modified LLDPE | 0.930 | 2.50 | DuPont |
| mLLD 2 | GT4408 | Maleic anhydride modified LLDPE | 0.919 | 2.30 | Westlake Chemical |
| mLLD3 | ADMER NF518E | Maleic anhydride modified LLDPE | 0.91 | 3.1 | Mitsui Chemical |
| mPP | ADMER QB 520E | Maleic anhydride modified polypropylene | 0.9 | 1.8 | Mitsui Chemical |
| EMA | SP2205 | Ethylene/methyl acrylate copolymer | 0.941 | 2.0 | Westlake Chemical |
| EMAA | NUCREL 1202 | Ethylene/methacrylic acid copolymer | 0.94 | 1.5 | DuPont |
| ION | SURLYN 1601 | Ionomer resin | 0.940 | 1.3 | DuPont |
| SBS 1 | HYBRAR 7311 | Styrene/butadiene/styrene block copolymer | — | 0.5 | Kuraray EU |
| SBS 2 | HYBRAR 7125 | Styrene/butadiene/styrene block copolymer | 0.90 | 0.7 | Kuraray EU |
| SBS 3 | STYROFLEX 2G66 | styrene/butadiene/styrene block copolymer | 1.992 | 11.0 | BASF |
| EVOH | E171B | ethylene/vinyl alcohol copolymer | 1.14 | 1.7 | Evalca/Kuraray |
| EVOH2 | SOARNOL AT4403 | Hydrolyzed ethylene vinyl acetate copolymer | 1.14 | 3.5 | Nippon Gohsei |
| PA6/66 | ULTRAMID C33 LN 01 | Polyamide - 6/66 | 1.13 | — | BASF |
| PAMXD6 | MX7007 | Polyamide MXD6 | | | Mitsubishi |
| AB | 10,075ACP Syloid Concentrate | Silica in polyethylene | 0.97 | 3.0 | Teknor Color |
| SLIP 1 | 102109 | N,N'-ethylene-bis-oleamide in LLDPE | 0.93 | 3.1 | Ampacet |
| SLIP 2 | MB50-802 | 20-40 wt % silica 50 wt % UHMW Polysiloxane in 10-30 wt % LDPE | 1.03 | 8.0 | Dow Corning |
| SLIP 3 | 10850 | Antiblock and slip in polyethylene | 1.00 | 2.0 | Ampacet |
| SLIP4 | CONSTAB AB 06051 LD | Silica in linear low density polyethylene | 1.03 | 3.3 | IMCD Italia spa |

Film No. 1 (Prior Art)

Table A, below, provides the structure and composition of Film No. 1, including the identities of the polymers used in the various layers, the arrangement of the layers, and the thickness of the layers. Film No. 1 was a prior art film produced in accordance with the process illustrated in FIG. 2, described above.

TABLE A

| Layer Layer function | Prior Art Top Web Film | | | | | | |
|---|---|---|---|---|---|---|---|
| | Seal | 1st Bulk | 1st Tie | Barrier | 2nd Tie | 2nd Bulk | Abuse |
| Layer ComPosition | 95% ssPE8 5% AB | EVA 1 | mLLD 1 | EVOH | mLLD 1 | EVA 1 | 95% HDPE2 5% AB |
| wt. % | 7.8 | 31.3 | 7.85 | 8.7 | 7.85 | 30.0 | 6.5 |
| Thickness | 0.47 mil | 1.88 mil | 0.47 mil | 0.52 mil | 0.47 mil | 1.80 mil | 0.39 mil |

Tables 2 through 34, below, provide the structure and composition of Film No. 1 through Film No. 32, including the identities of the polymers used in the various layers, the arrangement of the layers, and the thickness of the layers. Films No. 1 through Film No. 34 were all produced in accordance with the process illustrated in FIG. 2, described above.

TABLE 2

| Layer Layer function | Film No. 1 | | | | | | |
|---|---|---|---|---|---|---|---|
| | Seal | 1st Bulk | 1st Tie | Barrier | 2nd Tie | 2nd Bulk | Abuse |
| Layer ComPosition | 45% ssPE 2 50% ssPE 4 5% SLIP 1 | EVA 1 | mLLD 1 | EVOH | mLLD 1 | EVA 1 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 3

| Layer Layer function | Film No. 2 | | | | | | |
|---|---|---|---|---|---|---|---|
| | Seal | 1st Bulk | 1st Tie | Barrier | 2nd Tie | 2nd Bulk | Abuse |
| Layer ComPosition | 45% ssPE 2 50% ssPE 4 5% SLIP 1 | EVA 1 | mLLD 2 | EVOH | mLLD 2 | EVA 1 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 4

| Layer Layer function | Film No. 3 ||||||| 
|---|---|---|---|---|---|---|---|
| | Seal | 1st Bulk | 1st Tie | Barrier | 2nd Tie | 2nd Bulk | Abuse |
| Layer ComPosition | 45% ssPE 2<br>50% ssPE 4<br>5% SLIP 1 | ssPE 3 | mLLD 2 | EVOH | mLLD 2 | ssPE 3 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 5

| Layer Layer function | Film No. 4 |||||||
|---|---|---|---|---|---|---|---|
| | Seal | 1st Bulk | 1st Tie | Barrier | 2nd Tie | 2nd Bulk | Abuse |
| Layer Com-Position | 35% ssPE 2<br>35% ssPE 4<br>5% SLIP 1<br>25% ENB 2 | ssPE 3 | mLLD 2 | EVOH | mLLD 2 | ssPE 3 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 6

| Layer Layer function | Film No. 5 |||||||
|---|---|---|---|---|---|---|---|
| | Seal | 1st Bulk | 1st Tie | Barrier | 2nd Tie | 2nd Bulk | Abuse |
| Layer Com-Position | 45% ssPE 2<br>50% ssPE 4<br>5% SLIP 1 | 50% ssPE 3<br>50% ssPE 1 | mLLD 2 | EVOH | mLLD 2 | 50% ssPE 3<br>50% ssPE 1 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 7

| Layer Layer function | Film No. 6 |||||||
|---|---|---|---|---|---|---|---|
| | Seal | 1st Bulk | 1st Tie | Barrier | 2nd Tie | 2nd Bulk | Abuse |
| Layer Com-Position | 45% ssPE 2<br>50% ssPE 4<br>5% SLIP 1 | hPE 1 | mLLD 1 | EVOH | mLLD 1 | hPE 1 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 8

| Layer function | Film No. 7 | | | | | | |
|---|---|---|---|---|---|---|---|
| | Seal | 1st Bulk | 1st Tie | Barrier | 2nd Tie | 2nd Bulk | Abuse |
| Layer Composition | 45% ssPE 2 50% ssPE 4 5% SLIP 1 | ION | mLLD 2 | EVOH | mLLD 2 | ION | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 9

| Layer function | Film No. 8 | | | | | | |
|---|---|---|---|---|---|---|---|
| | Seal | 1st Bulk | 1st Tie | Barrier | 2nd Tie | 2nd Bulk | Abuse |
| Layer Composition | 45% ssPE 2 50% ssPE 4 5% SLIP 1 | 70% PEC 30% SBS 1 | mLLD 2 | EVOH | mLLD 2 | 70% PEC 30% SBS 1 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 10

| Layer function | Film No. 9 | | | | | | | | |
|---|---|---|---|---|---|---|---|---|---|
| | Seal | 1st Bulk | 3rd Bulk | 1st Tie | Barrier | 2nd Tie | 4th Bulk | 2nd Bulk | Abuse |
| Layer Composition | 45% ssPE 2 50% ssPE 4 5% SLIP 1 | 70% PEC 30% SBS 1 | hPE 1 | mLLD 2 | EVOH | mLLD 2 | hPE 1 | 70% PEC 30% SBS 1 | 95% HDPE1 4% SLIP 3 1% SLIP 2 |
| wt. % | 9.1 | 15.2 | 12.1 | 3.0 | 21.2 | 3.0 | 12.1 | 6.1 | 18.2 |
| Thickness | 3 | 5 | 4 | 1 | 7 | 1 | 4 | 2 | 6 |

TABLE 11

| Layer function | Film No. 10 | | | | | | |
|---|---|---|---|---|---|---|---|
| | Seal | 1st Bulk | 1st Tie | Barrier | 2nd Tie | 2nd Bulk | Abuse |
| Layer Composition | 45% ssPE 2 50% ssPE 4 5% SLIP 1 | 70% PEC 30% SBS 2 | mLLD 2 | EVOH | mLLD 2 | 70% PEC 30% SBS 2 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 12

| Layer function | Film No. 11 | | | | | | |
|---|---|---|---|---|---|---|---|
| | Seal | 1st Bulk | 1st Tie | Barrier | 2nd Tie | 2nd Bulk | Abuse |
| Layer Composition | 45% ssPE 2 50% ssPE 4 5% SLIP 1 | SBS 3 | mLLD 2 | EVOH | mLLD 2 | SBS 3 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 13

| Layer | Film No. 12 | | | | | | |
|---|---|---|---|---|---|---|---|
| function | Seal | 1st Bulk | 1st Tie | Barrier | 2nd Tie | 2nd Bulk | Abuse |
| Layer Com-Position | 45% ssPE 2 50% ssPE 4 5% SLIP 1 | EtCop | mLLD 2 | EVOH | mLLD 2 | EtCop | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 14

| Layer | Film No. 13 | | | | | | |
|---|---|---|---|---|---|---|---|
| function | Seal | 1st Bulk | 1st Tie | Barrier | 2nd Tie | 2nd Bulk | Abuse |
| Layer Com-Position | 45% ssPE 2 50% ssPE 4 5% SLIP 1 | 50% ssPE 3 50% ssPE 1 | mLLD 2 | 80% EVOH 20% PAMXD6 | mLLD 2 | 50% ssPE 3 50% ssPE 1 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 15

| Layer | Film No. 14 | | | | | | |
|---|---|---|---|---|---|---|---|
| function | Seal | 1st Bulk | 1st Tie | Barrier | 2nd Tie | 2nd Bulk | Abuse |
| Layer Com-Position | 45% ssPE 2 50% ssPE 4 5% SLIP 1 | 50% ssPE 3 50% ssPE 1 | mLLD 2 | 80% EVOH 20% PA6/66 | mLLD 2 | 50% ssPE 3 50% ssPE 1 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 16

| Layer | Film No. 15 | | | | | | | | |
|---|---|---|---|---|---|---|---|---|---|
| function | Seal | 1st Bulk | 3rd Bulk | 1st Tie | Barrier | 2nd Tie | 4th Bulk | 2nd Bulk | Abuse |
| Layer Com-Position | 45% ssPE 2 50% ssPE 4 5% SLIP 1 | 50% ssPE3 50% ssPE1 | mLLD 2 | PA6/66 | 80% EVOH 20% PA6/66 | PA6/66 | mLLD 2 | 50% ssPE3 50% ssPE1 | 95% HDPE1 4% SLIP 3 1% SLIP 2 |
| wt. % | 8.3 | 26.7 | 5 | 6.7 | 8.3 | 6.7 | 5 | 26.7 | 6.7 |
| Thickness | 0.5 | 1.6 | 0.3 | 0.4 | 0.5 | 0.4 | 0.3 | 1.6 | 0.4 |

TABLE 17

| Layer | Film No. 16 | | | | | | |
|---|---|---|---|---|---|---|---|
| function | Seal | 1st Bulk | 1st Tie | Barrier | 2nd Tie | 2nd Bulk | Abuse |
| Layer Com-Position | 45% ssPE 2 50% ssPE 4 5% SLIP 1 | EVA2 | mEVA | EVOH | mEVA | EVA2 | 95% HDPE1 4% SLIP 3 1% SLIP 2 |
| wt. % | 8.3 | 30 | 8.3 | 8.3 | 8.3 | 30 | 6.7 |
| Thickness | 0.5 mil | 1.8 mil | 0.5 mil | 0.5 mil | 0.5 mil | 1.8 mil | 0.4 mil |

TABLE 18

| Layer | Film No. 17 | | | | | | |
|---|---|---|---|---|---|---|---|
| function | Seal | 1st Bulk | 1st Tie | Barrier | 2nd Tie | 2nd Bulk | Abuse |
| Layer Com-Position | 45% ssPE 2 50% ssPE 4 5% SLIP 1 | hPE 1 | mLLD 2 | 80% EVOH 20% PA6/66 | mLLD 2 | hPE 1 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 19

| Layer | Film No. 18 | | | | | | |
|---|---|---|---|---|---|---|---|
| function | Seal | 1st Bulk | 1st Tie | Barrier | 2nd Tie | 2nd Bulk | Abuse |
| Layer Com-Position | 35% ssPE 2 35% ssPE 4 5% SLIP 1 25% ENB2 | hPE 1 | mLLD 2 | EVOH | mLLD 2 | hPE 1 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 20

| Layer | Film No. 19 | | | | | | |
|---|---|---|---|---|---|---|---|
| function | Seal | 1st Bulk | 1st Tie | Barrier | 2nd Tie | 2nd Bulk | Abuse |
| Layer Com-Position | 25% ssPE 2 30% ssPE 4 5% SLIP 1 40% ENB2 | hPE 1 | mLLD 2 | EVOH | mLLD 2 | hPE 1 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 21

| Layer | Film No. 20 | | | | | | |
|---|---|---|---|---|---|---|---|
| function | Seal | 1st Bulk | 1st Tie | Barrier | 2nd Tie | 2nd Bulk | Abuse |
| Layer Com-Position | 35% ssPE 2 35% ssPE 4 5% SLIP 1 25% ENB2 | 75% hPE 1 25% ENB2 | mLLD 2 | EVOH | mLLD 2 | 75% hPE 1 25% ENB2 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 22

| Layer function | Film No. 21 | | | | | | |
|---|---|---|---|---|---|---|---|
|  | Seal | 1st Bulk | 1st Tie | Barrier | 2nd Tie | 2nd Bulk | Abuse |
| Layer Com-Position | 35% ssPE 2<br>35% ssPE 4<br>5% SLIP 1<br>25% ENB2 | 60% hPE 1<br>40% ENB2 | mLLD 2 | EVOH | mLLD 2 | 60% hPE 1<br>40% ENB2 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 23

| Layer function | Film No. 22 | | | | | | |
|---|---|---|---|---|---|---|---|
|  | Seal | 1st Bulk | 1st Tie | Barrier | 2nd Tie | 2nd Bulk | Abuse |
| Layer Com-Position | 35% ssPE 2<br>35% ssPE 4<br>5% SLIP 1<br>25% ENB2 | 40% hPE 1<br>60% ENB2 | mLLD 2 | EVOH | mLLD 2 | 40% hPE 1<br>60% ENB2 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 24

| Layer function | Film No. 23 | | | | | | |
|---|---|---|---|---|---|---|---|
|  | Seal | 1st Bulk | 1st Tie | Barrier | 2nd Tie | 2nd Bulk | Abuse |
| Layer Com-Position | 35% ssPE 2<br>35% ssPE 4<br>5% SLIP 1<br>25% ENB2 | 40% hPE 1<br>60% ENB1 | mLLD 2 | EVOH | mLLD 2 | 40% hPE 1<br>60% ENB1 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 25

| Layer function | Film No. 24 | | | | | | |
|---|---|---|---|---|---|---|---|
|  | Seal | 1st Bulk | 1st Tie | Barrier | 2nd Tie | 2nd Bulk | Abuse |
| Layer Com-Position | 35% ssPE 2<br>35% ssPE 4<br>5% SLIP 1<br>25% ENB2 | 60% hPE 1<br>40% ENB1 | mLLD 2 | EVOH | mLLD 2 | 60% hPE 1<br>40% ENB1 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 26

| Layer function | Film No. 25 | | | | | | |
|---|---|---|---|---|---|---|---|
| | Seal | 1st Bulk | 1st Tie | Barrier | 2nd Tie | 2nd Bulk | Abuse |
| Layer Com-Position | 35% ssPE 2<br>35% ssPE 4<br>5% SLIP 1<br>25% ENB2 | 75% hPE 1<br>25% ENB1 | mLLD 2 | EVOH | mLLD 2 | 75% hPE 1<br>25% ENB1 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 27

| Layer function | Film No. 26 | | | | | | |
|---|---|---|---|---|---|---|---|
| | Seal | 1st Bulk | 1st Tie | Barrier | 2nd Tie | 2nd Bulk | Abuse |
| Layer Com-Position | 35% ssPE 2<br>35% ssPE 4<br>5% SLIP 1<br>25% ENB2 | hPE 1 | mLLD 2 | EVOH | mLLD 2 | hPE 1 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 28

| Layer function | Film No. 27 | | | | | | |
|---|---|---|---|---|---|---|---|
| | Seal | 1st Bulk | 1st Tie | Barrier | 2nd Tie | 2nd Bulk | Abuse |
| Layer Com-Position | 25% ssPE 2<br>30% ssPE 4<br>5% SLIP 1<br>40% ENB2 | hPE 1 | mLLD 2 | EVOH | mLLD 2 | hPE 1 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 29

| Layer function | Film No. 28 | | | | | | |
|---|---|---|---|---|---|---|---|
| | Seal | 1st Bulk | 1st Tie | Barrier | 2nd Tie | 2nd Bulk | Abuse |
| Layer Com-Position | 45% ssPE 2<br>50% ssPE 4<br>5% SLIP 1 | hPE 2 | mLLD 2 | EVOH | mLLD 2 | hPE 2 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 30

| Layer function | Film No. 29 | | | | | | |
|---|---|---|---|---|---|---|---|
| | Seal | 1st Bulk | 1st Tie | Barrier | 2nd Tie | 2nd Bulk | Abuse |
| Layer Com-Position | 45% ssPE 2<br>50% ssPE 4<br>5% SLIP 1 | hPE 3 | mLLD 2 | EVOH | mLLD 2 | hPE 3 | 95% HDPE1<br>4% SLIP 3<br>1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 31

| Layer | Film No. 30 | | | | | | |
|---|---|---|---|---|---|---|---|
| function | Seal | 1st Bulk | 1st Tie | Barrier | 2nd Tie | 2nd Bulk | Abuse |
| Layer Com-Position | 45% ssPE 2 50% ssPE 4 5% SLIP 1 | ssPE 5 | mLLD 2 | EVOH | mLLD 2 | ssPE 5 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 32

| Layer | Film No. 31 | | | | | | |
|---|---|---|---|---|---|---|---|
| function | Seal | 1st Bulk | 1st Tie | Barrier | 2nd Tie | 2nd Bulk | Abuse |
| Layer Com-Position | 45% ssPE 2 50% ssPE 4 5% SLIP 1 | 50% hPE 1 50% hPE 3 | mLLD 2 | EVOH | mLLD 2 | 50% hPE 1 50% hPE 3 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 33

| Layer | Film No. 32 | | | | | | |
|---|---|---|---|---|---|---|---|
| function | Seal | 1st Bulk | 1st Tie | Barrier | 2nd Tie | 2nd Bulk | Abuse |
| Layer Com-Position | 70% ssPE 8 25% ENB 2 5% SLIP 1 | hPE 1 | mLLD 1 | EVOH | mLLD 1 | hPE 1 | 95% HDPE1 4% SLIP 3 1% SLIP 2 |
| wt. % | 8.3 | 33.3 | 5.0 | 8.3 | 5.0 | 33.3 | 6.7 |
| Thickness | 0.5 mil | 2.0 mil | 0.3 mil | 0.5 mil | 0.3 mil | 2.0 mil | 0.4 mil |

TABLE 34

| | Tray Liner Film Layer function | | | | |
|---|---|---|---|---|---|
| | Seal (food contact layer) | Tie | Tie | Barrier | Bonding (adhered to polypropylene sheet) |
| | Layer Composition | | | | |
| | 50% LDPE 49% EMAA 1% SLIP1 | EMA | mLLD 3 | EVOH2 | mPP |
| wt. % | 4.7 | 14.0 | 20.9 | 14.0 | 46.5 |
| Thickness | 0.08 mil | 0.24 mil | 0.35 mil | 0.24 mil | 0.79 mil |
| Thickness | 2 μ | 6μ | 9μ | 6μ | 20μ |

The tray liner film had a maximum thickness of 1.69 mils (43 microns) and was known as PLB274Z, obtained from Multiflex Folien GmbH & Co.

The support sheet was a polypropylene sheet having a maximum thickness of from 20 to 25 mils. The polypropylene support sheet was purchased from Mullenix.

Table 35, below, summarizes the composition of various layers of Film Nos. 1-31, and provides the results of the implosion resistance test, in millimeters of hole diameter, using the above test procedure.

TABLE 35

Implosion Results for Film Nos 1-31 As Function of Composition

| Film No | Wt % et/α-olefin (total wt top web) | Wt % COC (total wt top web) | Et/α-o + COC (total wt %) | Avg Density et/α-olefin (g/cm³) | Implosion Resistance Test (mm, avg) | Other Notable Components in Seal and Bulk Layer of Top Web (% is wt %) |
|---|---|---|---|---|---|---|
| 1 | 7.9 | 0 | 7.9 | 0.901 | 12.6 | 66.6% EVA |
| 2 | 7.9 | 0 | 7.9 | 0.901 | 13.1 | 66.6% EVA |
| 3 | 74.5 | 0 | 74.5 | 0.900 | 13.5 | |
| 4 | 74.5 | 0 | 74.5 | 0.900 | 15.0 | |
| 5 | 74.5 | 0 | 74.5 | 0.887 | 14.4 | |
| 6 | 74.5 | 0 | 74.5 | 0.905 | 15.9 | |
| 7 | 7.9 | 0 | 7.9 | 0.901 | 11.4 | 66.6% ionomer resin |
| 8 | 7.9 | 0 | 7.9 | 0.901 | 0 | 46.6% PEC; 20% SBS1 |
| 9 | 32.8 | 0 | 32.8 | 0.904 | 0 | 14.9% PEC; 6.4% SBS1 |
| 10 | 7.9 | 0 | 7.9 | 0.901 | 0 | 46.6% PEC; 20% SBS2 |
| 11 | 7.9 | 0 | 7.9 | 0.901 | 0 | 66.6% SBS 3 |
| 12 | 74.5 | 0 | 74.5 | 0.870 | 10.2 | 66.6% olefin block copolymer |
| 13 | 74.5 | 0 | 74.5 | 0.887 | 13.4 | |
| 14 | 74.5 | 0 | 74.5 | 0.887 | 13.3 | |
| 15 | 61.3 | 0 | 61.3 | 0.887 | 12.5 | 13.4% PA 6/66 |
| 16 | 7.9 | 0 | 7.9 | 0.901 | 0 | 60% EVA2 |
| 17 | 74.5 | 0 | 74.5 | 0.905 | 13.5 | |
| 18 | 72.4 | 2.1 | 74.5 | 0.905 | 16.3 | |
| 19 | 71.2 | 3.3 | 74.5 | 0.905 | 16.2 | |
| 20 | 55.8 | 18.7 | 74.5 | 0.905 | 11.6 | |
| 21 | 45.8 | 28.7 | 74.5 | 0.905 | 15.4 | 100% of ENB was ENB2 |
| 22 | 31.1 | 43.4 | 74.5 | 0.904 | 13.7 | 100% of ENB was ENB2 |
| 23 | 31.1 | 43.4 | 74.5 | 0.904 | 8.8 | 92% of ENB was ENB1 |
| 24 | 45.8 | 28.7 | 74.5 | 0.904 | 11 | 92% of ENB was ENB1 |
| 25 | 55.8 | 18.7 | 74.5 | 0.905 | 13.3 | 89% of ENB was ENB1 |
| 26 | 72.4 | 2.1 | 74.5 | 0.905 | 14.9 | 100% of ENB was ENB2 |
| 27 | 71.2 | 3.3 | 74.5 | 0.905 | 15.7 | |
| 28 | 74.5 | 0 | 74.5 | 0.905 | 13.4 | |
| 29 | 74.5 | 0 | 74.5 | 0.911 | 14.1 | Heterogeneous et/α-olefin |
| 30 | 74.5 | 0 | 74.5 | 0.911 | 13.2 | Homogeneous et/α-olefin |
| 31 | 74.5 | 0 | 74.5 | 0.908 | 13.6 | |
| 32 | 72.4 | 2.1 | 74.5 | 0.906 | not tested | |

In Table 35, above, the amount of ethylene/α-olefin copolymer is calculated based on ethylene/α-olefin copolymer in the seal layer and the bulk layers, but does not include the small qualities of ethylene/alpha-olefin copolymer in the slip agents used in the outer layers of the top web film. Although the small quantities of ethylene/α-olefin in SLIP1 and SLIP3 may have contributed to implosion resistance and slightly elevate the weight percent ethylene/alpha-olefin copolymer reported for the films, all of the films contained about the same amounts of these slip agents so the small effect did not alter the relative implosion resistance results for the films, i.e., the implosion resistance relative to each other.

As is apparent from the data above, the top webs containing a styrene-butadiene-styrene block copolymer (Film No. 11) or a blend of propylene/ethylene copolymer (PEC) and styrene butadiene styrene copolymer (Film Nos. 8-10) also exhibited poor results in the Implosion Resistance Test (average of 0 mm). The three top webs containing ethylene/vinyl acetate copolymer (Film Nos. 1, 2, and 16) exhibited mediocre implosion resistance in a room temperature Implosion Resistance Test (average of 8.6 mm). Similarly, the only top web containing ionomer resin (Film No. 7) also exhibited mediocre poor implosion resistance in the room temperature Implosion Resistance Test (11.4 mm).

In contrast, top web Film Nos. 21-29, which containing a blend of ethylene/alpha-olefin copolymer and cyclic olefin copolymer (i.e., COC, which was solely ethylene norbornene copolymer, ENB) exhibited good implosion resistance in the Implosion Resistance Test, i.e., an average Implosion Resistance of (average value 13.7 mm). Those with predominantly ENB1 (i.e., Film Nos. 23, 24, 25, 27, avg implosion resistance 12.2 mm), which had a density of 1.02 and a melt index of 2.04 dg/min, did not perform as well as those with predominantly ENB2 (Film Nos. 18, 19, 20, 21, 22, 26, average implosion resistance 14.7 mm), which had a density of 0.974 and a melt index of 1.0 dg/min.

Moreover, Film Nos. 18 and 19, which contained 25 wt % to 40 wt % COC in the seal layer in a blend with ethylene/α-olefin copolymer, exhibited some of the highest average implosion resistance values (16.3 mm and 16.2 mm, respectively).

The top webs containing ethylene/α-olefin copolymer without cyclic olefin copolymer (i.e., Film Nos. 3-6, 12, 13, 14, 15, 17-20, 31) exhibited an average implosion resistance value of 13.8 mm in the Implosion Resistance Test conducted at room temperature.

The best implosion resistance was obtained from the top webs containing a relatively high fraction of relatively low density heterogeneous ethylene/α-olefin copolymer in the seal and bulk layers, either with or without a COC present in the seal layer or bulk layer, so that either the ethylene/α-olefin copolymer alone or the ethylene/α-olefin plus the COC together made up at the majority of the weight of the top web film, i.e., Film Nos. 5, 6, 17, 18, 19, 21, 22, 25, 26, 27, 28, 29, and 31. These top web films exhibited an average room temperature Implosion Resistance Test Result of 14.5 mm. The films containing a low density heterogeneous ethylene/α-olefin copolymer (0.9025 g/cm³) in the bulk layer and from 25 wt % to 40 wt % COC in the seal layer.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A vacuum skin package having an implosion-resistant top web, the implosion resistant top web including a multilayer film (10) comprising:
   (A) a heat seal and product contact layer (24) comprising at least one ethylene/α-olefin copolymer in a total amount of from 40 wt % to 95 wt %, based on weight of the heat seal and product contact layer (24), and a cyclic olefin copolymer in an amount of from 1 wt % to 50 wt %, based on weight of the heat seal and product contact layer (24);

(B) a heat resistant outside layer (22) comprising at least one member selected from the group consisting of low density polyethylene, high density polyethylene, polypropylene, polyester and cyclic olefin copolymer;

(C) an oxygen barrier layer (12) comprising at least one member selected from the group consisting of saponified ethylene/vinyl acetate copolymer, polyvinylidene chloride, and polyamide, (D) a first tie layer (18) comprising at least one member selected from the group consisting of ethylene/carboxylic acid copolymer, ethylene/ester copolymer, anhydride-modified ethylene/α-olefin copolymer, anhydride-modified high density polyethylene, and anhydride modified low density polyethylene, the first tie layer (18) being between the oxygen barrier layer (12) and the heat seal and product-contact layer (24), the first tie layer (18) having a principal surface adhered to the oxygen barrier layer (12);

(E) a second tie layer (20) comprising at least one member selected from the group consisting of ethylene/carboxylic acid copolymer, ethylene/ester copolymer, anhydride-modified ethylene/α-olefin copolymer, anhydride-modified high density polyethylene, and anhydride modified low density polyethylene, the second tie layer (20) being between the oxygen barrier layer (12) and the heat resistant outside layer (22), the second tie layer (20) having a principal surface adhered to the oxygen barrier layer (12);

(F) a first bulk layer (14) comprising at least one member selected from the group consisting of ethylene/α-olefin copolymer, cyclic olefin copolymer, olefin homopolymer, ethylene/unsaturated ester copolymer, ionomer resin, propylene/ethylene copolymer, polystyrene, polyamide, polyester, and polycarbonate, the first bulk layer (14) being between the first tie layer (18) and the heat seal and product-contact layer (24), (G) a second bulk layer (16) comprising at least one member selected from the group consisting of ethylene/α-olefin copolymer, cyclic olefin copolymer, olefin homopolymer, ethylene/unsaturated ester copolymer, ionomer resin, propylene/ethylene copolymer, polystyrene, polyamide, polyester, and polycarbonate, the second bulk layer (16) being between the second tie layer (20) and the outer abuse layer (22)

the ethylene/α-olefin copolymer(s) in the top web have an average density of from 0.88 g/cm$^3$ to 0.915 g/cm$^3$.

2. The vacuum skin package according to claim 1, wherein the heat seal and product contact layer (24) comprises the ethylene/α-olefin copolymer in a total amount of from 45 wt % to 90 wt %, based on weight of the heat seal and product contact layer (24), and the cyclic olefin copolymer is present in an amount of from 5 wt % to 47 wt %, based on weight of the heat seal and product contact layer (24).

3. The vacuum skin package according to claim 1, wherein the heat seal and product contact layer (24) comprises the ethylene/α-olefin copolymer in a total amount of from 50 wt % to 85 wt %, based on weight of the heat seal and product contact layer (24), and the cyclic olefin copolymer is present in an amount of from 15 wt % to 44 wt %, based on weight of the heat seal and product contact layer (24).

4. The vacuum skin package according to claim 1, wherein the heat seal and product contact layer (24) comprises the ethylene/α-olefin copolymer in a total amount of from 55 wt % to 80 wt %, based on weight of the heat seal and product contact layer (24), and the cyclic olefin copolymer is present in an amount of from 25 wt % to 40 wt %, based on weight of the heat seal and product contact layer (24).

5. The vacuum skin package according to claim 1, wherein the ethylene/α-olefin copolymer of the heat seal and product contact layer (24) has an average density of from 0.90 g/cm$^3$ to 0.91 g/cm$^3$.

6. The vacuum skin package according to claim 1, wherein the cyclic olefin copolymer of the heat seal and product contact layer (24) is an ethylene/norbornene copolymer having a density of less than 0.98 g/cm$^3$, and the ethylene/α-olefin copolymer of the heat seal and product contact layer (24) has an average density of from 0.90 g/cm$^3$ to 0.91 g/cm$^3$.

7. The vacuum skin package according to claim 1, wherein the cyclic olefin copolymer of the heat seal and product contact layer (24) is an ethylene/norbornene copolymer having a density of less than 0.98 g/cm$^3$ and a melt index of less than 1.5 dg/min, and the ethylene/α-olefin copolymer of the heat seal and product contact layer (24) has an average density of from 0.902 g/cm$^3$ to 0.908 g/cm$^3$.

8. The vacuum skin package according to claim 1, wherein the top web comprises ethylene/α-olefin copolymers having an average melt index of from 0.8 to 3 dg/min.

9. The vacuum skin package according to claim 1, further comprising a support member which is a tray having a bottom product support portion and side walls extending upwardly from the product support portion.

10. The vacuum skin package according to claim 1, wherein the top web does not comprise ionomer resin.

11. The vacuum skin package according to claim 1, wherein the top web comprises a crosslinked polymer network.

12. The vacuum skin package according to claim 1, wherein the top web exhibits an average implosion resistance of at least 13 millimeters and has a maximum thickness of 9 mils.

13. The vacuum skin package according to claim 1, wherein the top web has maximum thickness of from 3 mils to 9 mils.

14. The vacuum skin package according to claim 1, wherein the cyclic olefin copolymer of the heat seal and product contact layer (24) is an ethylene/norbornene copolymer.

15. The vacuum skin package according to claim 14, wherein the ethylene/norbornene copolymer has a density of less than 0.98 g/cm$^3$.

16. The vacuum skin package according to claim 15, wherein the ethylene/norbornene copolymer has a melt index of less than 1.5 dg/min.

* * * * *